United States Patent Office 3,229,571
Patented Jan. 18, 1966

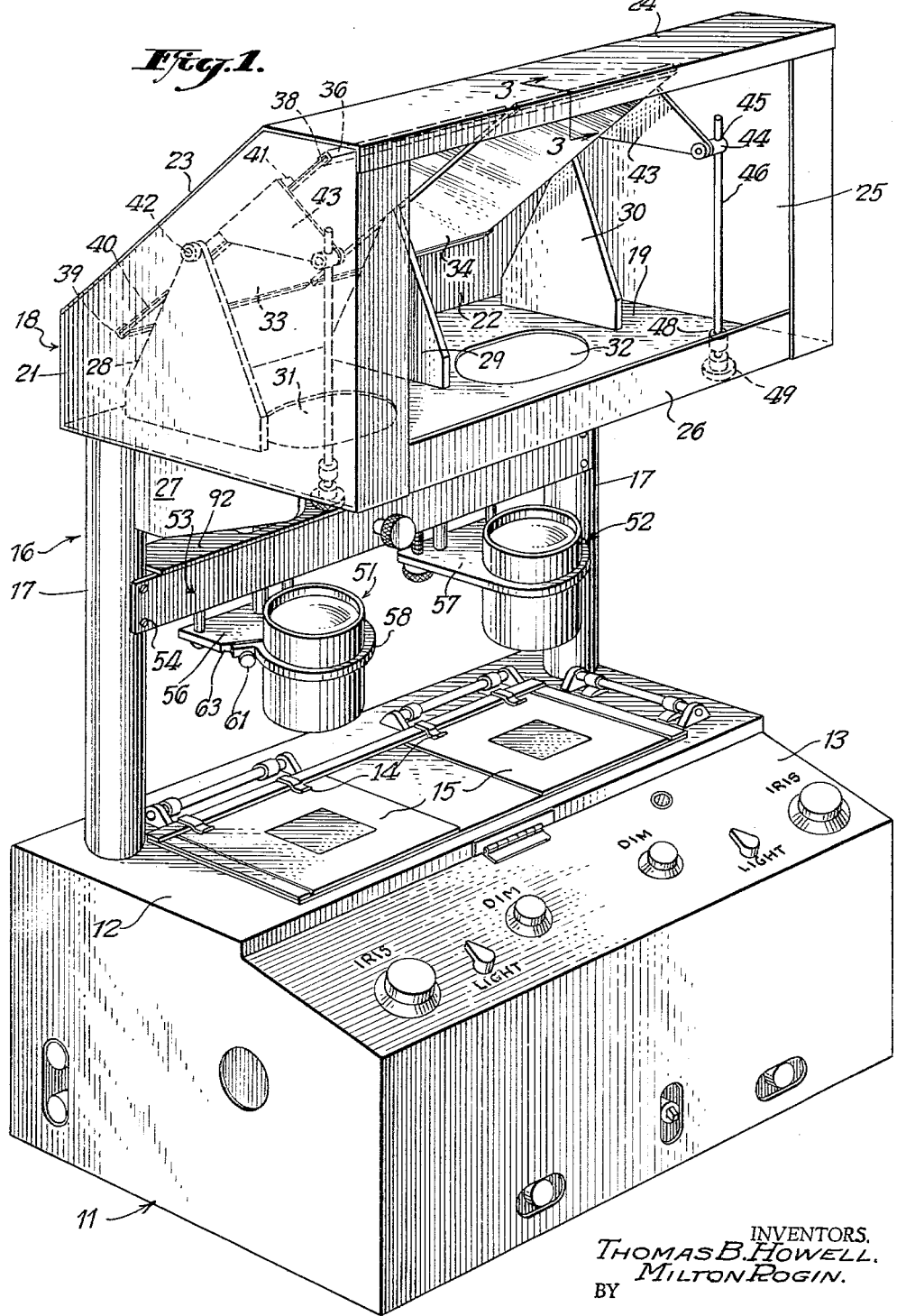

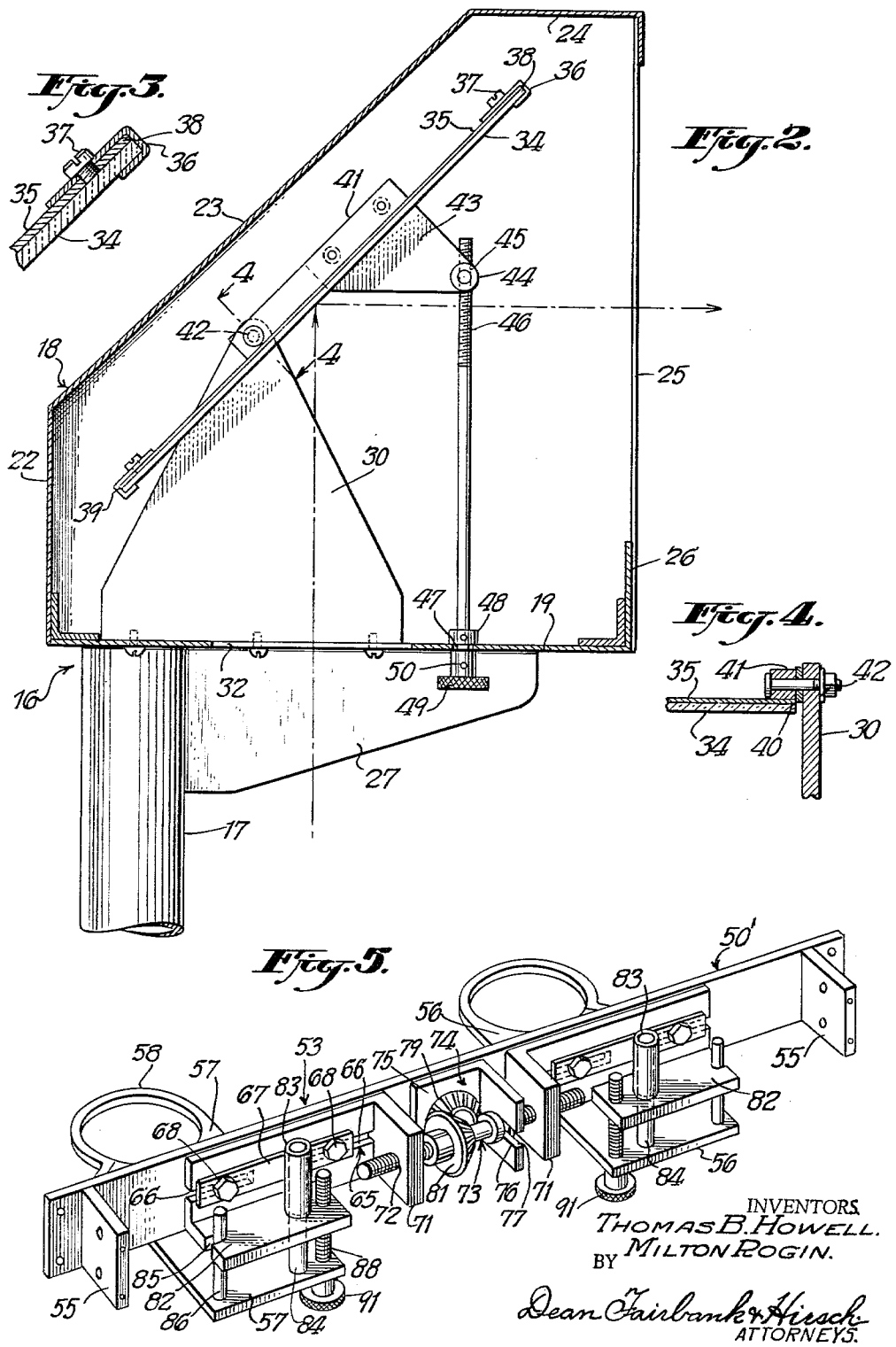

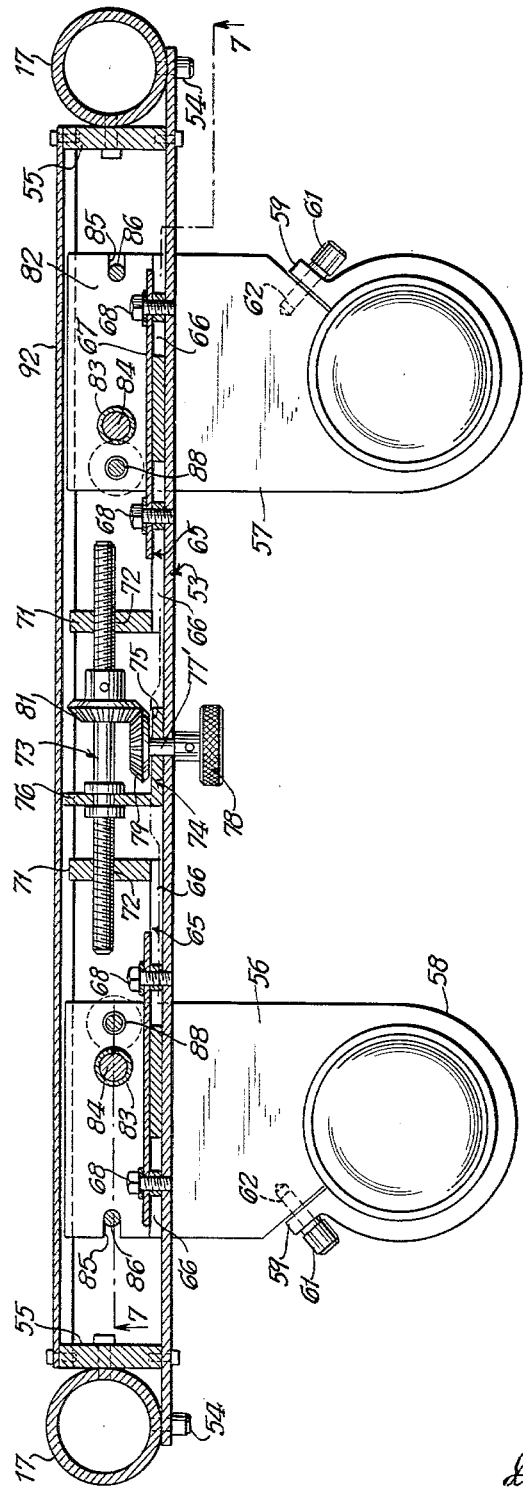

3,229,571
EQUIPMENT UTILIZING A PAIR OF INCLINED SPACED MIRRORS FOR PROJECTING A COMPOSITE OPTICAL IMAGE
Thomas B. Howell, 1815 Palmer Ave., Larchmont, N.Y., and Milton Rogin, 924 Woodmere Drive, North Woodmere, N.Y.
Filed Oct. 12, 1961, Ser. No. 144,648
2 Claims. (Cl. 88—24)

This application is a continuation-in-part of copending application Serial No. 685,905, filed September 24, 1957, now Patent No. 3,025,756, dated March 20, 1962.

This invention relates to the art of projection equipment more particularly of the type to provide unique visual effects for television transmission.

Where it is desired to project onto a screen, for example, a composite image from two distinct transparencies, since the transparencies are generally mounted in a cardboard frame, unless the frames are identical in size and the transparencies are identically positioned in each frame, proper registry of the identical images on the screen is difficult to obtain.

Furthermore, even if the transparencies and their associated frames are identical, if they should not be identically positioned on the supporting holder of the projection equipment, lack of registry will also occur.

It is accordingly among the objects of the invention to provide a composite image projection equipment of the same general type as that shown in Patent No. 2,944,461 which permits various visual results to be accomplished, which equipment does not require exact tolerances in the assembly of transparencies in their frames nor of the positioning of the transparencies on the equipment, yet with a relatively simple mechanism which may readily be adjusted by the operator after but a short period of instruction, will permit accurate registry of the individual images into a composite image.

According to the invention, these objects are accomplished by the arrangement and combination of elements hereinafter described and more particularly recited in the claims.

In the accompanying drawings in which is shown one of various possible embodiments of the several features of the invention, FIG. 1 is a perspective view of the equipment, FIG. 2 is a fragmentary transverse sectional view taken along substantially the center of the projection head, FIG. 3 is a detail sectional view taken along line 3—3 of FIG. 1, FIG. 4 is a view similar to FIG. 3 taken along line 4—4 of FIG. 2, FIG. 5 is a perspective view taken from the rear of the lens adjustment mechanism, FIG. 6 is a top plan view partly in section of the lens adjustment mechanism, and FIG. 7 is a view taken along line 7—7 of FIG. 6.

Referring now to the drawings, as shown in FIG. 1, the projection equipment desirably comprises a hollow housing 11 which defines the base of the equipment. The base 11 contains a pair of electric lamps and suitable lenses and mirrors to permit light from the lamps to be projected upwardly through appropriate iris controlled openings in the top wall 12 of the base. The projection lamps and irises may be controlled by suitable operating elements on the front panel 13 of the equipment. As the elements in the housing 11 may be of the type shown in Patent No. 2,944,461 and form no part of the present invention, they will not be described.

Positioned on the top wall 12 of the front panel are suitable mounting means 14 whereby a transparency 15 may be positioned over each of the openings in the top wall 12 for projection of light therethrough.

According to the invention, a projection head 16 is mounted on the top wall 12 of the housing 11. As is clearly shown in FIG. 1, the projection head comprises a pair of upstanding posts or standards 17 secured at their lower ends in fixed position in the housing 11. Mounted on the upper ends of the posts 17 is a housing 18 which, as clearly shown in FIGS. 1 and 2, has a floor 19, side walls 21, a rear wall 22, the upper portion of which is inclined forwardly as at 23, and a top wall 24. The front of the housing 18 is substantially open as at 25, a peripheral border 26 defining such opening.

The housing 18 is desirably reinforced by means of brackets 27 secured to the undersurface of the floor of the housing and to the posts 17.

Secured to the floor 19 of the housing 18 and rising therefrom are a plurality of upstanding spaced, parallel supports, illustratively three in number and designated 28, 29 and 30. Each of the supports is illustratively in the form of a triangular panel having its apex at its upper end.

The panels 28, 29 and 29, 30 respectively, straddle enlarged openings 31 and 32 in the floor 19 of the housing 18, which are vertically aligned respectively with the openings in the top wall 12 of the base 11 through which the light is projected and over which the transparencies 15 are positioned.

Positioned between the pairs of supports 28, 29 and 29, 30 respectively and pivotally mounted with respect thereto are rectangular mirrors 33 and 34, each preferably of the front surface type.

As shown in FIGS. 2 and 3, a rectangular reinforcing plate 35 is in juxtaposition with each of the mirrors 33, 34. An elongated U-shaped strip 36 secured as by screws 37 to the upper and lower edges 38, 39 of plate 35 retains the associated mirror in place. Secured to each of the transverse edges 40 of each plate 35 is an elongated block 41, said blocks being pivoted to the opposed apices of the support plates 28, 29 and 29, 30 as at 42 so that the mirrors may be pivoted on a horizontal axis.

Means are provided to adjust the position of each of the mirrors. To this end, as shown in FIG. 1, a forwardly projecting arm 43 is secured to the block 41 on the outer edge of each of the mirrors between its pivotal mount 42 and the upper edge 38 thereof. Pivotally mounted on a horizontal axis to the free end of each of the arms 43 is a hub 44 which has a bore 45 therethrough at right angles to such horizontal pivotal axis. The bore 45 of each of the hubs 44 is internally threaded to receive the correspondingly threaded end of an elongated adjustment screw 46 which extends vertically through an enlarged opening 47 in the top wall of the housing 18 adjacent the opening 25 thereof. Secured to said adjustment screw 46 near its lower end and resting on the top wall 19 is a collar 48. The portion of the screw protruding beneath the top wall 19 mounts an adjustment knob 49 secured to the screw as by set screw 50. Thus, upon rotation of the knobs 49 and the screws 46, the individual mirrors 33, 34 may be pivoted on their axes 42 to determine the inclination of said mirrors.

Positioned between the inclined mirrors 33 and 34 and the openings in the top wall 12 of the casing are lens systems 51 and 52 which are identical in construction and which are so mounted that their vertical and horizontal positions may be adjusted.

To this end, as shown in the drawings, an adjustment assembly 50′ is provided comprising an elongated rectangular support plate 53, the ends of which may be secured as by screws 54 to the upright posts 17 between the floor 19 of the housing 18 and the top wall 12 of the housing 11. In addition, a pair of rectangular blocks 55 are secured respectively to the plate 53 inwardly of its outer ends and these blocks are also secured to posts 17.

Supported by said elongated plate 53 are lens systems mounting plates 56 and 57. As is clearly shown in FIGS. 1 and 6, each of the plates at its outer end has a relatively narrow curved strip 58 formed integral at one end with the main body of the plate and having at its free end, an outwardly extending flange 59 through which a screw 61 extends into a threaded opening 62 in the side edge 63 of the plate. The strip 58 is substantially resilient so that when the cylindrical lens system is positioned in the opening defined by the curved strip, and the screw 61 is tightened, each lens system will be securely retained in position on the associated plate with its axis in vertical position.

Secured to the rear of the plate 53 and associated with each of the lens systems is a rectangular lens carrying strip 65 which has longitudinally aligned elongated slots 66 extending from each end thereof toward the center of the plate. Extending through each end of a narrow strip 67 and through each of the slots 66 is a screw 68 which retains the strip 65 against the plate 53, said screws being loosely tightened to permit longitudinal movement of the strips 65 along the plate 53 in the manner now to be described.

The inner end of each of the strips 65 has secured thereto a rectangular block 71 which extends laterally outward therefrom at right angles thereto. The blocks 71 have longitudinally aligned bores 72 therethrough which are internally threaded to receive the ends of a threaded rod 73. The threads on each end of the rod 73 and those in the bores 72 are in reverse direction so that upon rotation of the rod 73 in one direction, the blocks 71 and the strips 65 secured thereto will move toward each other and upon rotation of the rod 73 in the opposite direction, they will move away from each other.

In order to rotate the rod 73, an L-shaped bracket 74 is provided having one leg 75 secured to the plate 53 and the other leg 76 extending outwardly at right angles thereto. The leg 76 has a recess 77 in its outer edge with suitable washers to accommodate substantially the midportion of the rod 73. A shaft 77' extending through the leg 76 of the bracket 74 and through the plate 53 mounts a knob 78 at its outer end and a bevel gear 79 at its inner end which coacts with a complementary bevel gear 81 secured to the rod 73.

Secured to the lower edge of each of the strips 65 and extending outwardly therefrom at right angles thereto is an elongated block 82. Each of the blocks 82 has a sleeve 83 secured thereto, through which extends a rod 84, the lower end of which is secured to the associated mounting plate 56, 57. In addition, the outer end of each of the blocks 82 has a notch 85 to accommodate a guide rod 86 also secured to the end of the associated plates 56, 57. Each of the blocks 82 also has a threaded opening 87 which serves to accommodate an adjustment screw 88 that extends through a vertical bore 89 in the mounting plate and has a knob 91 at its free end. Thus, upon rotation of the knob 91 and the adjustment screw 88, the plates 56, 57 will be raised and lowered as desired, guided by the rods 84 and 86 so that the lens system 51, 52 may also be raised and lowered as desired.

The adjustment assembly 50' heretofore described has a cover member secured thereto which may comprise an elongated substantially L-shaped sheet metal strip 92 which is secured to the rear ends of blocks 55.

In the operation of the equipment above described, suitable transparencies 15 are positioned on the top wall 12 of the housing 11 over the openings therein. These transparencies are retained in position by the resilient clamps 14.

Thereupon, the lamps are energized so that the images on the transparencies will be projected through the associated lens system 51, 52 onto the inclined mirrors 33, 34 to be reflected outwardly as a composite image through opening 25 onto a suitable screen, for example.

In order to compensate for variations in the vertical distance between each of the transparencies 15 and the associated mirrors 33, 34, as well as for the distance between the mirrors and the screen, the knobs 91 are individually rotated to focus the projected image on such screen.

In addition, as the position of each of the transparencies with respect to the lenses 51, 52 may differ due to variations in the mounting in their frame and the positioning of the transparencies on top wall 12, the vertical and horizontal position of the images on the screen must be adjusted.

This is readily accomplished by individual rotation of knobs 49 and screws 46 to tilt the mirrors 33, 34 so that the projected superimposed images on the screen are in horizontal alignment, and by rotation of knob 78 to move the lens system 51, 52 toward and away from each other until the superimposed images are in vertical alignment.

It is apparent that by the simple mechanism and simple adjustment above described, a precisely aligned composite image may be produced regardless of the misalignment of the transparencies used.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment for projecting a composite optical image, said equipment comprising a base having a top wall with a pair of spaced openings, means in said base for projecting light through said openings, means for mounting a transparency on said top wall over each of the openings therein, a projection head over said base, said projection head comprising a pair of spaced mirrors each positioned at an incline over an associated light projecting source, a housing vertically spaced from the top wall of said base and encompassing said spaced mirrors, said housing having a floor including a pair of openings vertically aligned with said mirrors, a pair of lenses positioned respectively beneath said openings, a pair of upstanding supports mounted on the floor of said housing, said mirrors being pivotally mounted between adjacent supports, an arm secured to each of said mirrors and extending outwardly therefrom at right angles thereto, a hub rotatably mounted on the end of each arm on an axis extending at right angles thereto, each hub having a threaded bore extending in a plane parallel to that of said arm, a substantially vertical screw extending through each of said threaded bores and through the floor of said housing, means to restrain vertical movement of said screws, whereby upon rotation of the latter the associated mirrors will be pivoted to change their inclination, a pair of posts extending upwardly from said base and supporting said housing, an elongated plate extending transversely across said posts and secured thereto between said housing and the top wall of said base, a pair of slidably mounted strips mounted on the rear of said elongated plate for movement toward and away from each other longitudinally of said plate, a member secured to the adjacent ends of said strips, each of said members having a horizontal threaded bore, a threaded rod extending through said bores, the threads in said bores and at each end of the rod being in reverse sense, an adjustment shaft extending through said plate, gear means on said shaft and said rod to rotate said rod on rotation of said shaft, a block secured to each of said slidably mounted strips and extending rearwardly therefrom, a pair of lens mounting plates positioned beneath each of said blocks and extending forwardly beneath said elongated plates, vertical guide rods secured at one end to each of said plates and extending through said plates, and a screw extending through each of said plates and through a third opening in said blocks, whereby upon rotation of said screw said plates will be moved vertically, and means at the outer end of each of said plates to mount an associated lens with its longitudinal axis in vertical position.

2. The combination set forth in claim 1 in which each of the plates has an elongated resilient curved strip at its outer end defining a substantially circular opening to receive an associated lens, and means to clamp the free end of said strip to the associated plate releasably to lock the lens in place.

References Cited by the Examiner
UNITED STATES PATENTS

| | | | |
|---|---|---|---|
| 1,291,954 | 1/1919 | Losey | 88—16.4 |
| 2,700,322 | 1/1955 | Gruber | 88—16.6 |
| 2,754,722 | 7/1956 | Howell et al. | 88—24 |
| 2,813,455 | 11/1957 | Fitzgerald | 88—24 |
| 2,824,490 | 2/1958 | Fitzgerald | 88—24 |
| 3,025,756 | 3/1962 | Howell et al. | 88—16.6 |

LEO SMILOW, *Primary Examiner.*

EMIL G. ANDERSON, *Examiner.*